Nov. 15, 1938.    J. D. NIXON    2,136,457
MEASURING DEVICE
Filed Nov. 22, 1937
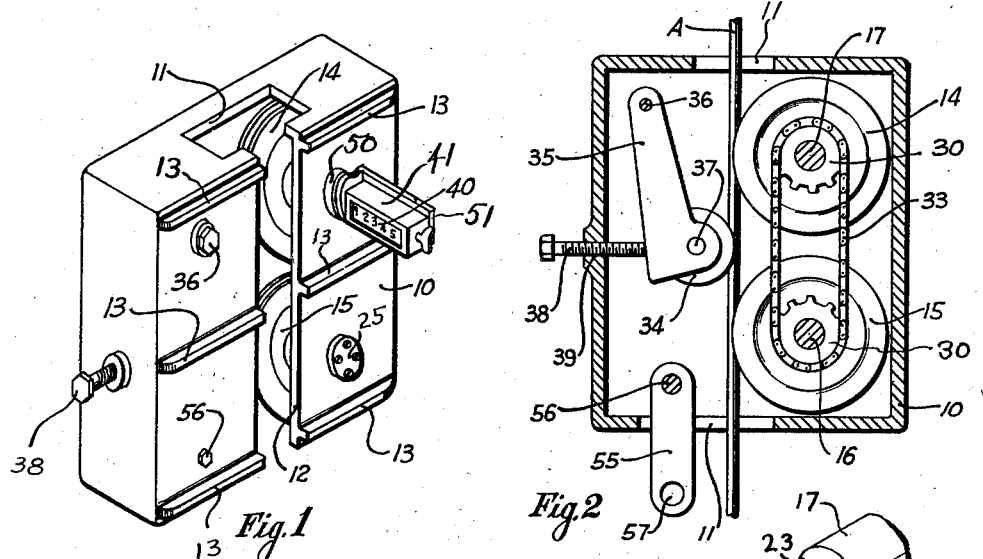
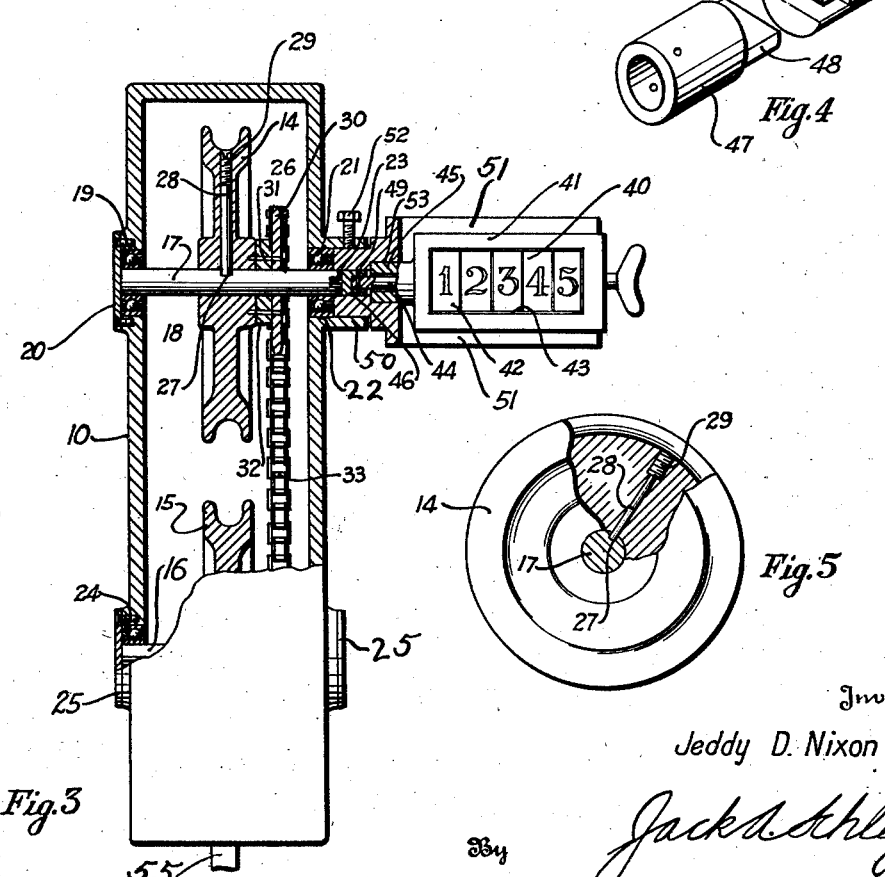
Inventor
Jeddy D. Nixon
By Jack A. Ashley
Attorney Patented Nov. 15, 1938

2,136,457

UNITED STATES PATENT OFFICE 2,136,457

MEASURING DEVICE

Jeddy D. Nixon, Houston, Tex., assignor of one-half to Wilson Supply Company, Houston, Tex., a corporation of Texas Application November 22, 1937, Serial No. 175,905

2 Claims. (Cl. 33—134)

This invention relates to new and useful improvements in measuring devices.

One object of the invention is to provide an improved device adapted to receive a line or cable which extends therethrough and being constructed to accurately measure the line as it passes therethrough.

An important object of the invention is to provide an improved measuring device for measuring a line or other element lowered into a well bore to determine the depth of said bore, or locate the position of an object in the bore; said device being arranged to be mounted on or adjacent to the usual surface stuffing box through which the line extends whereby a more accurate measurement may be obtained.

Another object of the invention is to provide an improved measuring device having pulleys which are engaged by the line being measured so as to be rotated thereby, together with a counter or indicating mechanism actuated by said pulleys; there being an improved connection between the pulleys and indicating mechanism, whereby said mechanism is not affected by slight deflections in the line and a more accurate measurement is obtained.

A further object of the invention is to provide an improved device of the character described, having a pair of pulleys connected to each other to rotate simultaneously, with an idler located on a plane between the axis of the pulleys whereby the line to be measured passes between the pulleys and said idler, the latter acting to hold said line in engagement with the pulleys and having positive means for varying its position to accommodate lines of various sizes; the device also including a recording or indicating mechanism which is detachably connected to the pulleys and is actuated by the rotation thereof.

A construction designed to carry out the invention will be hereinafter described, together with other features of the invention.

The invention will be more readily understood from a reading of the following specification and by reference to the accompanying drawing, in which an example of the invention is shown, and wherein:

Figure 1 is an isometric view of a measuring device, constructed in accordance with the invention, Figure 2 is a longitudinal, vertical, sectional view of the same, Figure 3 is a view partly in elevation and partly in section, and showing the uppermost drive pulley in full section, Figure 4 is an isometric view of the connection between the pulley shaft and the indicating and recording mechanism, and Figure 5 is a view, partly in elevation and partly in section, of one of the drive pulleys.

In the drawing, the numeral 10 designates a casing or housing which is substantially rectangular in cross-section. The top and bottom of the casing are closed and are provided with alined openings 11 having a general rectangular shape. One side of the casing is formed with a vertical slot 12 which extends through the height thereof and which communicates with the openings 11, as is clearly shown in Figure 1. Obviously, the line A or other element may be easily placed within or removed from the alined openings 11 through the vertical slot 12 and it is not necessary to thread the line through said openings. The outer sides of the casing 10 may be provided with suitable reenforcing ribs 13, which are preferably made integral therewith.

A pair of drive pulleys 14 and 15 are located within the casing or housing 10 at one side thereof. The lower pulley 15 is mounted on a transverse shaft 16, while the upper pulley 14 is mounted on a transverse shaft 17. The shafts extend transversely through the casing and since each are mounted in substantially the same manner, a description of one will suffice. The shafts are located one above the other in vertical alinement with the casing (Figure 2) and the uppermost shaft 17 has one end mounted in a suitable bearing 18. The bearing is confined within an opening 19, being held therein by a removable retaining plate or disk 20. The other end of the shaft 17 is supported within a suitable bearing 21, similar to the bearing 18, and the bearing 21 is disposed within an opening 22 provided in the wall of the casing. It is noted that the outer end of the shaft 17 extends outwardly of the bearing 21 and is provided with a transverse slot 23 so that it may be readily connected with an indicating and recording mechanism, as will be explained. The lowermost shaft 16 has its ends mounted in bearings 18 which are located within openings 24 in the casing wall. Retaining plates 25 confine the bearings within said opening and manifestly the lower shaft 16 has its ends confined within the casing by the said plates.

The pulleys 14 and 15 may be mounted on their respective shafts in any suitable manner, but it is preferable to fasten the same as shown in Figures 3 and 5. Each pulley is formed with a radial bore 26 which extends from the base of the groove of said pulley to the center thereof and each shaft is provided with an alined radial groove 27. An elongate pin or rod 28 is inserted in the bore 26 and has its inner end engaged within the recess 27 in the shafts. The upper end of the rod is engaged by a threaded screw 29 which is theaded into the upper end of the bore 26. Manifestly, the screw 29 holds the rod or pin 28 in engagement with the radial recess within the shafts and in this manner the pulleys are secured to said shafts, whereby rotation of said pulleys will impart rotation to the shafts.

A sprocket 30 is secured by bolts 31 to the hub of each pulley and said sprocket is spaced from the hub by a suitable spacing collar or ring 32. As is clearly shown in Figure 3, the sprocket 30 secured to the pulley 24 has a central opening through which the shaft 17 extends, while the sprocket which is fastened to the pulley 15, is provided with a similar opening through which the shaft 16 extends. An endless chain 33 passes over the sprockets 30, fastened to the pulleys 14 and 15, and connects the pulleys, whereby a rotation of one will impart rotation to the other. Thus, it will be manifest that the pulleys 14 and 15 rotate simultaneously.

The line A, or other element extending through the casing 10, engages within the grooves of the pulleys and this line is held within said grooves by an idler wheel or roller 34. This roller is mounted on the lower end of an arm 35, which arm has its upper end pivoted on a pin 36 extending transversely within the casing. As is clearly shown in Figure 2, the roller 34 is rotatable on a pin 37 and the length of the arm 35 is such that the roller is substantially midway between the shaft 16 and shaft 17, being located at the opposite side or end of the casing 10. As has been stated, the line A engages the pulleys 14 and 15, while the opposite side of said line is engaged by the roller 34. Said roller is held in such engagement by a laterally extending screw 38 which is threaded through an opening 39 provided in one end of the casing. The inner end of the screw 38 engages the arm 35 and by adjusting said screw the position of the roller 34 with relation to the center of the casing may be varied. The screw is adjusted so that the roller 34 places sufficient tension against the line A, that said line is held in engagement with the base of the grooves in the pulleys 14 and 15, whereby a frictional contact between said line and pulleys is obtained. With such arrangement, the movement of the line vertically through the casing 10 will impart a rotation to the pulleys 14 and 15 because of the frictional contact between said line and said pulleys. The provision of the roller 34 which is movable to various positions within the casing, provides a medium whereby the tension of the line against the pulleys may be varied. Also various size lines or cables may be accommodated.

For recording the amount or length of line which passes through the casing 10, a suitable recording and indicating mechanism 40 is provided. This mechanism includes a casing 41 having the usual indicating wheels 42 therein. The indicating wheels carry the usual numerals which are visible through a window 43 provided in the casing 41. The operating shaft 44 of said mechanism extends from one end thereof and this shaft is surrounded by a collar 45 which is preferably made integral with the casing 41 (Figure 3). The shaft 44 extends outwardly from the collar 45 and has a coupling member 46 fastened thereto. The coupling member includes a sleeve 47 which engages over the end of the shaft 44 and which has an extending lug 48 projecting from its outer end. A pin 49 passes through the sleeve 47 and through the end of the shaft 44 to fasten the parts together. The lug 48 is adapted to engage in the transverse slot 23 formed in the extended end of the shaft 17 on which the pulley 14 is mounted.

For supporting the recording and indicating mechanism 40 in operating position at one side of the casing 10, an outwardly projecting collar 50 surrounds the opening within which the bearing 21 is mounted. This collar is adapted to receive one end of a supporting bracket 51, which is fastened within the collar by a suitable screw 52. As is clearly shown in Figures 1 and 3, the bracket 51 is angular and has its inner portion formed with a countersunk opening or bore 53, which is to receive the end of the shaft 17, as well as the coupling member 46 on the end of the shaft operating shaft of the recording mechanism. The enlarged portion of the bore 53 of the bracket has the collar 45 of the casing 41 insertable therein. With such arrangement, the indicating and recording mechanism 40 is removably supported on the casing 10 and the bracket 51 is removably fastened in the collar 50.

The operation of the device is obvious. The line A, or other element, is entered or inserted into the openings 11 within the top and bottom of the casing 10 through the vertical slot 12 provided in one wall of said casing. The line is engaged within the grooves of the pulleys 14 and 15 and the adjusting screw 38 is manipulated so as to move the roller 34 into engagement with the line, whereby said line is confined between the pulleys on one side and the roller 34 on the other. The proper tension may be placed on the line by adjusting the screw 38. As the line moves vertically through the casing, the frictional engagement of said line against the pulleys 14 and 15 will impart a rotation to said pulleys, which will rotate simultaneously due to the sprockets 30 and connecting chain 33. As the pulleys rotate, the shaft 17 of the upper pulley 14 is rotated and will impart a rotation to the operating shaft 44 of the recording and indicating unit 40 due to the engagement of the lug 48 within the transverse slot 23. The recording mechanism is of course adjusted to register the number of feet of line passing through the casing 10. It is noted that the connection between the shaft 17 and the operating shaft 44 of the recording mechanism is a loose connection, whereby slight deflections in the line A will not effect the recording mechanism and thereby a more accurate indication is obtained.

When the device is used to measure a line being introduced into, or removed from, a well, it is preferable to mount the device directly on or adjacent to the stuffing box through which the line A extends. This stuffing box is usually mounted at the surface of a well and by so mounting the casing, a more accurate measurement of the line may be had. When mounted directly on or adjacent to the stuffing box, some means must be provided for holding the same on said box when the line A is moved upwardly as the tendency will be to move the entire casing upwardly with said line. For this purpose, the opening 11 in the bottom of the casing 10 may be slightly enlarged so that a strap 55 may extend therethrough. This strap is pivoted on a pin 56 within the casing, and its opposite end is provided with an opening or eye 57. A rope or other fastening means may be passed through the opening 57 and tied around the stuffing box to maintain the casing in close proximity therewith.

What I claim and desire to secure by Letters Patent is:

1. A measuring device including, a casing having aligned openings in its top and bottom for accommodating an element extending through the casing and into a well, a pair of pulleys mounted in vertical alignment within said casing and journaled in the walls of said casing, each of said pulleys having a circumferential groove which is adapted to be frictionally engaged by the element extending through said casing, whereby movement of the element imparts rotation to said pulleys, an arm pivotally mounted within said casing, a single roller on the swinging end of said arm within said casing and located in a horizontal plane substantially mid-way between the centers of said pulleys, said roller engaging the element to hold the same in engagement with the circumferential grooves on said pulleys, a screw extending through one wall of said casing for engaging the swinging end thereof for varying the position of said roller to vary the tension on the element confined between said roller and said pulleys, and a registering mechanism connected with one of said pulleys for registering the rotations thereof, whereby the location of the lower end of the element extending through the casing and into a well may be determined.

2. A locating device including, a casing having aligned openings at its top and bottom for accommodating an element extending through the casing and into a well and an opening in one wall of said casing connecting the openings in the top and bottom of said casing, a pair of shafts journaled in the walls of said casing, a pulley mounted on each shaft in vertical alignment within said casing, said pulleys having circumferential grooves which are adapted to be frictionally engaged by the element extending through said casing, whereby movement of the element imparts rotation to said pulleys and said shafts, a sprocket mounted on each shaft adjacent and fastened to each pulley, a chain connecting and extending over said sprockets, a registering mechanism connected with one of said shafts for registering the rotations of said shafts, whereby the location of the lower end of the element extending through said casing and into a well may be determined, an arm pivotally mounted within said casing, a single roller on the swinging end of said arm within said casing and located in a horizontal plane substantially mid-way between the centers of said pulleys, said roller engaging the element to hold the same in engagement with the circumferential grooves on said pulleys, and a screw extending through one wall of said casing for engaging the swinging end thereof for varying the position of said roller to vary the tension on the element confined between said roller and said pulleys.

JEDDY D. NIXON.